US009790581B2

(12) United States Patent
Naim et al.

(10) Patent No.: US 9,790,581 B2
(45) Date of Patent: Oct. 17, 2017

(54) EMISSIVITY CONTROLLED COATINGS FOR SEMICONDUCTOR CHAMBER COMPONENTS

(71) Applicant: FM Industries, Inc., Fremont, CA (US)

(72) Inventors: Mahmood Naim, Poughkeepsie, NY (US); David Hammerich, Fremont, CA (US)

(73) Assignee: FM Industries, Inc., Fremont, CA (US)

( * ) Notice: Subject to any disclaimer, the term of this patent is extended or adjusted under 35 U.S.C. 154(b) by 364 days.

(21) Appl. No.: 14/562,810

(22) Filed: Dec. 8, 2014

(65) Prior Publication Data

US 2015/0376760 A1 Dec. 31, 2015

Related U.S. Application Data

(60) Provisional application No. 62/016,895, filed on Jun. 25, 2014.

(51) Int. Cl.
| | | |
|---|---|---|
| *C23C 4/12* | (2016.01) | |
| *C04B 35/505* | (2006.01) | |
| *C09K 5/14* | (2006.01) | |
| *C01F 17/00* | (2006.01) | |
| *C23C 4/02* | (2006.01) | |
| *C23C 28/04* | (2006.01) | |
| *C23C 4/11* | (2016.01) | |
| *C04B 35/486* | (2006.01) | |

(52) U.S. Cl.
CPC .......... *C23C 4/127* (2013.01); *C01F 17/0018* (2013.01); *C01F 17/0043* (2013.01); *C04B 35/486* (2013.01); *C04B 35/505* (2013.01); *C09K 5/14* (2013.01); *C23C 4/02* (2013.01); *C23C 4/11* (2016.01); *C23C 28/042* (2013.01); *C23C 28/048* (2013.01); *C01P 2006/32* (2013.01); *C04B 2235/3225* (2013.01); *C04B 2235/3244* (2013.01)

(58) Field of Classification Search
None
See application file for complete search history.

(56) References Cited

U.S. PATENT DOCUMENTS

| | | | |
|---|---|---|---|
| 4,419,201 A | 12/1983 | Levinstein et al. | |
| 5,362,523 A * | 11/1994 | Gorynin | C23C 4/02 427/446 |

(Continued)

FOREIGN PATENT DOCUMENTS

| | | |
|---|---|---|
| EP | 1 898 457 A1 | 3/2008 |
| WO | 2009/072318 A1 | 6/2009 |

OTHER PUBLICATIONS

Written Opinion of the International Preliminary Examining Authority, International Application No. PCT/US2014/071427, dated Mar. 21, 2016 (5 pages).

(Continued)

*Primary Examiner* — David Sample
(74) *Attorney, Agent, or Firm* — Burr & Brown, PLLC

(57) ABSTRACT

A component for a semiconductor processing chamber, the component including a substrate and a coating layer provided on a surface of the substrate, wherein the coating layer includes at least a first coating layer having a thermal emissivity of more than 0.98 to 1, having plasma resistance, and having a color value L in a range of 35 to 40 through a thickness direction thereof.

23 Claims, 11 Drawing Sheets

(56) References Cited

U.S. PATENT DOCUMENTS

| | | | |
|---|---|---|---|
| 5,637,237 A | 6/1997 | Oehrlein et al. | |
| 6,776,873 B1 | 8/2004 | Sun et al. | |
| 7,364,798 B2 | 4/2008 | Harada et al. | |
| 7,494,723 B2 | 2/2009 | Harada et al. | |
| 2003/0029563 A1 | 2/2003 | Kaushal et al. | |
| 2007/0026246 A1 | 2/2007 | Harada et al. | |
| 2007/0221132 A1* | 9/2007 | Chandran | C23C 18/00 118/728 |
| 2007/0224451 A1* | 9/2007 | Chandran | C04B 35/16 428/698 |
| 2008/0029032 A1 | 2/2008 | Sun et al. | |
| 2008/0141938 A1* | 6/2008 | Chandran | C04B 35/44 118/723 E |
| 2009/0060480 A1* | 3/2009 | Herchen | H01L 21/67248 392/416 |
| 2010/0272982 A1 | 10/2010 | Dickinson et al. | |
| 2011/0149462 A1* | 6/2011 | Kugimoto | H01L 21/6831 361/234 |
| 2012/0177908 A1 | 7/2012 | Petorak et al. | |
| 2012/0196139 A1 | 8/2012 | Petorak et al. | |

OTHER PUBLICATIONS

International Search Report and Written Opinion, International Application No. PCT/US2014/071427, dated Apr. 7, 2015 (12 pages).

\* cited by examiner

EMISSIVITY CONTROLLED COATINGS FOR SEMICONDUCTOR CHAMBER COMPONENTS

FIELD OF THE INVENTION

The present invention relates to thermal sprayed coatings for plasma chambers used in the etching or deposition processes of conductors or dielectric materials in the manufacture of semiconductor devices. In particular, the present invention relates to thermal emissivity controlled coatings for semiconductor processing chamber components.

BACKGROUND OF THE INVENTION

Semiconductor processing chambers are used for etching processes or the deposition of various materials inside a vacuum environment. These chambers have means for generating plasma to create energetic ions and a reactive chemistry that are used to perform the etching or deposition functions. These substances, however, are typically quite corrosive to the semiconductor chamber components surrounding the work pieces, and the corrosion can cause the generation of particles within the chamber that contaminate the semiconductor processing system and interfere with the precision processing steps.

Coatings have been developed to provide plasma resistance for components used in semiconductor processing chambers. The focus of these coatings, however, has been on compositional selection alone to try to reduce the problem of plasma erosion caused by the presence of activated fluorine or chlorine gases within the processing chamber. Most of the earlier coatings used in semiconductor process chambers were defined to solve one or two problems only; namely, corrosion of surfaces exposed to plasma and/or high particle generation.

Thermal spraying technology is a known means for depositing high melting point materials on low melting point substrates. For example, metal oxides, such as $Al_2O_3$, $Cr_2O_3$, $TiO_2$, $ZrO_2$, $MgO_2$, $Y_2O_3$, $Gd_2O_3$ and mixtures of various oxides have been be deposited on aluminum, steel or various alloy substrates to provide wear resistance and/or corrosion resistance using thermal spray deposition mechanisms (Ref. ASM Handbook, Vol. 5, Surface Engineering, Thermal Spray Coatings).

Yttrium oxide (yttria) is known as a single oxide material that resists fluorine plasma erosion. Yttria coatings have been produced by various methods such as thermal spray, chemical vapor deposition (CVD), physical vapor deposition (PVD), aerosol deposition (AD) and sol gel methods. Various metal oxide coatings, such as $Y_2O_3$, and lanthanide series rare earth oxides, such as $Ce_2O_3$, $Sm_2O_3$, $Gd_2O_3$, $Yb_2O_3$ and mixtures thereof, have been described for use in connection with semiconductor process chamber components to prevent plasma erosion of these components when exposed to halogen chemistries.

For example, U.S. Pat. No. 4,419,201 describes the use of a thermal sprayed $Al_2O_3$ coating on the surfaces of a reaction chamber to prevent chlorine gas plasma corrosion. U.S. Pat. No. 5,637,237 describes use of $Al_2O_3$, $Y_2O_3$ or $Sc_2O_3$ coatings on a heated chamber wall liner to reduce erosion of the walls when exposed to oxide etching gases, such as $C_2F_4$ and $C_2F_6$. U.S. Pat. No. 6,776,873 describes a high purity $Y_2O_3$ coating provided on anodized aluminum, where the $Y_2O_3$ may contain 10 wt % of $Al_2O_3$ to improve corrosion resistance against plasma containing fluorine and oxygen. U.S. Pat. No. 7,364,798 describes an internal member of a plasma etching chamber that is provided with a top coat of $Y_2O_3$ on top of $Al_2O_3$. U.S. Pat. No. 7,494,723 further describes an $Y_2O_3$ coating, where the top layer is densified by an electron beam process, and the coating (densified skin) may have an undercoat of $Al_2O_3$ or $Al_2O_3$ and $Y_2O_3$. It should be noted, however, that once the densified skin coating is eroded or the top layer is cracked, the undercoating layers can be suddenly exposed, which would result in a sudden increase in plasma erosion and generation of a very high number of particles, which, in turn, would result in poor yield of the product being manufactured.

U.S. Patent Application Publication No. 2010/0272982 A1 describes yttria stabilized zirconia coatings that provide plasma erosion resistance when exposed to $CF_4/O_2$. U.S. Patent Application Publication No. 2012/0177908 A1 further discloses the use of graded porosity in $Y_2O_3$ and $Zr_2O_3$ coatings for providing thermal strain resistance and plasma erosion resistance. U.S. Patent Application Publication No. 2012/0196139 A1 describes a composite coating with an undercoat of two ceramics for corrosion protection and a metal oxide top coat for plasma erosion protection.

However, prior to the present invention, no efforts have been made to control the thermal emissivity characteristics of the coatings or to evaluate the effects with respect to the uniformity of plasma etching performance or the improvement of plasma erosion resistance. Indeed, none of the prior art relates to controlling the emissivity of the coatings so as to increase the efficiency of thermal energy reflectance from chamber walls, and the prior art fails to recognize any beneficial significance whatsoever attributable to controlling the emissivity of the coatings. Moreover, none of the prior art addresses the need to or provide any means for controlling surface morphology to further improve particle reduction inside the processing chamber. In addition, further solutions are needed to reduce the interface corrosion and dielectric breakdown that are experienced by many semiconductor processing chamber components.

SUMMARY OF THE INVENTION

In addition to addressing the issues of plasma erosion prevention and reducing particle generation, the present invention also aims to improve thermal efficiency, and reduce interface corrosion and dielectric breakdown of coated semiconductor chamber components, which are issues that have not been addressed by the prior art whatsoever.

Thermal emissivity is a measure of the efficiency with which a surface reflects incident thermal energy into its surroundings. Since the thermal fields within the semiconductor processing chamber are subject, in part, to the reflectance of thermal energy from the surfaces of the walls and various components that surround the plasma and the work substrate within the processing chamber. Providing the high thermal emissivity coatings according to the present invention on components within the semiconductor processing chamber further enhances the temperature control within the processing chamber and increases the uniformity of the etching or deposition process across a wafer surface, thereby improving the overall semiconductor processing performance.

The present invention therefore provides high thermal emissivity coatings (also referred to as emissivity controlled coatings) for semiconductor processing chamber components including, but not limited to, chamber liners, focus rings, susceptors, shower heads, nozzles, heating elements and electrostatic chucks. Theses semiconductor processing chamber components, also sometimes referred to herein as substrates, can be made of metals like "bare" aluminum or anodized aluminum, as required for functionality, or a sintered ceramic material. Suitable examples of substrate materials include, but are not limited to $Al_2O_3$, AlN, SiC, graphite, and composite materials such as SiC—Al and SiSiC—Ti. An undercoating may also be provided if substrate material itself does not provide resistance to wet corrosion, as discussed below.

The emissivity controlled coatings according to the present invention include a top coating layer (top coat) that not only provides high plasma erosion resistance on the upper surface, but also through the thickness of the coating during the useful life of the chamber component due to its unique emissivity and compositional characteristics. The high thermal emissivity coatings according to the present invention are amorphous and appear black, as characterized by an L value of less than 85, preferably an L value of 35-45, and more preferably an L value of about 40, as measured by a spectrophotometer (also referred to herein as a spectrometer), compared to traditional white-colored yttria, alumina, or zirconia coatings, or coatings containing a mixture thereof, which instead have an L value of 87 or higher. These coatings according to the present invention maintain the desired L value, the high thermal emissivity characteristics and the high corrosion/erosion resistance throughout the entire thickness thereof. For example, plasma erosion testing with $CF_4$ has shown that the high thermal emissivity yttria coatings according to the present invention, which are black throughout their thickness, provide higher plasma erosion resistance compared to stoichiometric, white-colored yttria, alumina or zirconia coatings.

According to a first embodiment of the aspect of the present invention, a coating is provided, comprising at least a first coating layer having plasma resistance, a color value L, measured by a photo spectrometer, in a range of 35 to 40 through a thickness direction thereof, and a thermal emissivity of more than 0.98 to 1. Preferably, the coating further comprises at least a second coating layer, wherein the first coating layer defines a top coat layer, and the second coating layer defines an undercoat layer.

The first coating layer preferably comprises at least one of yttrium oxide, hafnium oxide, yttria fully stabilized zirconium oxide and mixtures thereof.

According to one aspect of the present invention, second coating layer comprises at least two of yttrium oxide, hafnium oxide, yttria fully stabilized zirconium oxide and mixtures thereof. According to another aspect, in the coating according to the second aspect, the second coating layer comprises silicon, silicon and silicon carbide, nickel, molybdenum or tungsten.

It is also preferred that, in the first coating layer, compounds of the yttrium and oxygen, zirconium and oxygen or hafnium and oxygen are concentrated in distinct segments of layers that are uniformly distributed in a direction that extends parallel to a surface of a substrate on which the coating is provided.

It is also preferred that a concentration of the composition of the first coating layer is graded from approximately 1 wt %, (±5%) near an interface between the first coating layer and a surface of a substrate on which the first coating layer is formed to 100 wt % at an upper surface of the first coating layer that is exposed to a plasma environment.

The first coating layer preferably has a surface roughness, Ra, in a range of 120 to 220 μin.

According to a second embodiment of the present invention, a component for a semiconductor processing chamber is provided, the component comprising a substrate, and a coating layer provided on a surface of the substrate. The coating layer comprises at least a first coating layer having plasma resistance, a color value L, measured by a spectrophotometer, in a range of 35 to 40 through a thickness direction thereof, and a thermal emissivity of more than 0.98 to 1. Preferably, the coating layer further comprises at least a second coating layer, wherein the first coating layer defines a top coat layer and the second coating layer defines an undercoat layer proximate the surface of the substrate on which the coating is formed.

It is preferred that the substrate comprises a metal or a sintered ceramic material. According to one aspect of the present invention, the substrate comprises aluminum or anodized aluminum, and according to another aspect, the substrate comprises a material selected from the group consisting of $Al_2O_3$, AlN, SiC and graphite.

Preferably, the first coating layer comprises at least one of yttrium oxide, hafnium oxide, yttria fully stabilized zirconium oxide and mixtures thereof.

According to one aspect, the second coating layer comprises at least two of yttrium oxide, hafnium oxide, yttria fully stabilized zirconium oxide and mixtures thereof, and according to another aspect, the second coating layer comprises silicon, silicon and silicon carbide, nickel, molybdenum or tungsten.

Preferably, in the first coating layer, compounds of the yttrium and oxygen, zirconium and oxygen or hafnium and oxygen are concentrated in distinct segments of layers that are uniformly distributed in a direction that extends parallel to the surface of the substrate on which the coating layer is formed.

It is also preferred that a concentration of the composition of the first coating layer is graded from approximately 1 wt %, (±5%) near an interface between the first coating layer and the surface of the substrate on which the coating layer is formed to 100 wt % at an upper surface of the first coating layer that is exposed to a plasma environment.

The coating layer preferably has a surface roughness, Ra, in a range of 120 to 220 μin.

The component can be any one of a chamber liner, a focus ring, a susceptor, a shower head, a nozzle, a heating element and an electrostatic chuck.

According to a third embodiment of the present invention, method for providing an emissivity controlled coating for a semiconductor processing chamber component is provided. The method comprises the steps of providing a component for use in a semiconductor processing chamber, and applying at least a first coating layer to a surface of the component using one of a plasma thermal spray device, HVOF, a D-Gun, SPS, AD and combinations thereof, wherein the first coating layer has plasma resistance, a color value L, measured by a photo spectrometer, in a range of 35 to 40 through a thickness direction thereof, and a thermal emissivity of more than 0.98 to 1. Preferably, the method further comprises the steps of providing comprising at least a second coating layer to the surface of the component, prior to forming the first coating layer, wherein the first coating layer defines a top coat layer and the second coating layer defines an undercoat layer.

According to another aspect of the method according to the present invention, the method further includes the steps of texturing the first coating layer to have a reduced surface roughness, precision cleaning the component in an ultrasonic chamber, using the component in a semiconductor processing chamber for a period of time corresponding to its first cycle of useful life, then grit blasting the component to remove the first coating layer (top coat) and, if present, the second coating layer (undercoat layer), and then reapplying the second coating layer (undercoat layer), if necessary, and the first coating layer (top coat layer) to the component to restore the functionality of the component for repeated use in a semiconductor processing chamber.

This aspect of the present invention relates to the ability of the components according to the present invention to be refurbished after use, and to the ability of the coatings to protect the component on which they are formed from the environmental conditions of semiconductor processing chambers during use.

The thermal emissivity controlled coatings according to the present invention, which are preferably applied to the substrate using a thermal spray process, such as plasma spray deposition, have compositions including yttria, also referred to as yttrium oxide ($Y_2O_3$), hafnium oxide ($Hf_2O_3$), zirconium oxide ($Zr_2O_3$) or mixtures thereof. For example, the emissivity controlled coatings include a mixture of stochiometric and sub-stochiometric yttrium oxide, $Y_2O_3$, $Y_{2-x}O_{3-y}$, hafnium oxides $Hf_2O_3$, $Hf_{2-x}O_{3-y}$ and zirconium oxide, $ZrO$, $ZrO_2$, $ZrO_y$, $YZrO_y$, $YZrHfO_y$, compositions (where 0<x<2 and 0<y<3) that also provide enhanced corrosion resistance to fluorine plasma or chlorine plasma in semiconductor process chambers.

In the present invention, the top coating layer (top coat) is preferably made of a composition that provides maximum thermal emissivity and maximum resistance to plasma exposure. For example, when the process requires resistance against fluorine plasma, a black color yttria coating having a composition of $Y_{(2-x)}O_{(3-y)}$, wherein 0<x<2 and 0<y<3, an L value of 40 and an emissivity in a range of 0.98 to 1 is preferred as a top coating layer, which is color and emissivity controlled through the thickness thereof.

When the process requires resistance against chlorine based plasma erosion, according to the present invention, the emissivity controlled coatings are preferably made of yttria fully stabilized zirconia (YFSZ), a combination of YFSZ and YO (i.e., $Y_{(2-x)}O_{(3-y)}$), or a combination of YFSZ, HfO and YO. It is preferred that to use yttria fully stabilized zirconia (YFSZ), which is a fully stabilized zirconia (FSZ) coating with about 18 wt % $Y_2O_3$. This is different from the more commonly used YSZ, which is actually only partially stabilized zirconia with less than about 14 wt % $Y_2O_3$. Fully stabilized zirconia, where $Y_2O_3$ is greater than 17% but less than 25%, is preferred over partially stabilized zirconia in that fully stabilized zirconia provides denser coatings that are less susceptible to cracking when subjected to thermal cycling and have a higher resistance to plasma erosion, which leads to fewer particles being generated when used in a semiconductor processing chamber.

The YFSZ coatings according to the present invention are preferably thermal sprayed in a controlled environment to control the oxygen content in order to ensure the resultant black-color coatings with an L value in a range of 40 to 45. Specifically, the plasma is generated by ionizing a mixture of gases containing argon, nitrogen and hydrogen in various proportions without any oxygen, as discussed in more detail below.

In the present invention, a concentration of the composition of the top coating layer is graded from approximately 1 wt %, (±5%) proximate an interface between the top coating layer and the surface of the substrate (or other layer, in the case of an under layer) on which the top coating layer is formed to 100 wt % at an upper surface of the top coating layer that is exposed to a plasma environment. That is, since the upper surface of the top coating is also required to have high emissivity, the composition of the uppermost portion of the top layer is held at 100% during the deposition process, which imparts higher emissivity and high plasma erosion resistance required when exposed to the plasma processing.

One skilled in the art who is familiar with conventional techniques involved in plasma spray deposition understands how it is possible to manipulate the composition of the various layers of the coating as it is deposited in order to provide a graded composition in such a manner. That is, since plasma spraying is a layer-by-layer deposition process, during which the coating is built up to a desired thickness, the composition and properties of the various strata can be individually controlled at any given layer and between the different deposition steps by changing the composition of the deposition materials. In the present invention, the composition of the uppermost layer, in contact with the corrosive environment, is controlled in order to provide the emissivity controlled properties and to have the color characteristics described above. The composition can also be advantageously varied closer to the substrate during the deposition process to instead provide the higher bond strength and wet corrosion resistance that is needed at or near the coating/substrate interface (discussed in more detail below).

In addition to high thermal emissivity and plasma resistance characteristics, the top (upper) surface of the top coating layer must also prevent the generation of any large particles that could otherwise interfere with the performance of the critical feature size during semiconductor component processing within the processing chamber. Accordingly, for one aspect of the present invention, the surface roughness characteristics of the emissivity controlled top coating layer are preferably controlled in order to reduce particle generation.

The as-sprayed surfaces of the emissivity controlled coatings according to the present invention typically have a surface roughness of 60 µin Ra or more, such as 60 to 120 µin Ra, 100 to 200 µin Ra, 150 to 250 µin Ra, or 200 to 300 µin Ra, depending upon on the particular thermal spray process parameters, but preferably about 120 to 220 µin Ra. In order to provide surface characteristics that do not generate large particles under plasma erosion, the surface is finished to have an Ra in a rage of 60 to 120 µin and an Rz of 500 to 1500 µin, which is essentially snag-free when cleaned in situ with diamond coated abrasive cleaning pads or clean room cloths that are commonly used for cleaning plasma chamber components. Such a finished surface further ensures low particle generation during the semiconductor device manufacturing conditions.

After the coated components are used in a semiconductor processing chamber for a period of time, various undesirable deposits are formed on the coated surfaces. These deposits are then removed by wet cleaning processes using chlorine-containing liquids, for example. However, the yttria compounds in the coatings are soluble in chlorine-containing solutions, such as HCl. Accordingly, during extended wet cleaning procedures, the coating/substrate interface can be corroded by the presence of aqueous HCl, resulting in the spallation of the coating in large segments, which is also known as undercutting. In order to eliminate the undesirable undercutting phenomena, the present invention further provides another coating layer, sometimes referred to as an undercoat layer, which serves as a wet corrosion barrier, in addition to (under) the top coat that is provided to enhance thermal emissivity and resistance to dry plasma exposure, as explained above. The corrosion barrier coating can also have emissivity controlled characteristics and plasma resistance, in addition to serving as an undercut-resistant layer.

For example, a dual-phase coating (50/50 wt %) of yttria fully stabilized zirconia (YFSZ) and emissivity controlled yttria (YO) having a composition of ($Y_{2-x}O_{3-y}$), can be applied on chamber components, where the plasma deposited coating has a lamellar structure, and the resulting microstructure has distinct phases of YFSZ and $Y_{2-x}O_{3-y}$ uniformly intermixed within the thermal sprayed splats formed by rastering the surface to be coated with the plasma deposition device. This co-phase coating layer serves as undercut-resistant layer, as described above, and is also referred to as a corrosion barrier coating to prevent corrosion from any wet cleaning. This co-phase layer also has a microstructure that provides adequate resistance to any fluorine gas that may penetrate the coating. This corrosion barrier coating (undercut-resistant layer) also offers sufficient surface roughness characteristics so that a top coating layer can be successfully deposited thereon without the need for any further surface roughening, which would otherwise be required for most thermal sprayed coatings in order to provide enhanced bond-strength at the interface.

The composition of the co-phase undercut-resistant coating can also be graded during the deposition, by virtue of the control provided during the deposition process, from a concentration of 100% YFSZ at the substrate interface to 50% YFSZ to 0% YFSZ (i.e., 100% YO) at the upper surface thereof, located away from the surface of the substrate on which the coating is applied (in the thickness direction of the coating). In that manner, the co-phase coating layer can serve as both an undercut-resistant layer (toward the bottom in the thickness direction) and an emissivity controlled top coat layer (toward the top in the thickness direction).

In addition, a different type of corrosion barrier underlayer can also be provided by forming a metallic underlayer on the surface of the substrate before forming the coating layer thereon. Suitable examples of metallic materials for such a corrosion barrier underlayer include, but are not limited to silicon, a combination of silicon and silicon carbide, aluminum and silicon carbide, nickel, molybdenum and tungsten.

Semiconductor processing chamber components also require protection against electrical breakdown. Such a voltage breakdown barrier can effectively be obtained by ensuring that the high emissivity coating has a thickness that exceeds its breakdown voltage. If necessary, additional voltage breakdown resistance can be provided by adjusting (increasing) the thickness of the undercoat layer (if provided) to provide a total coating thickness that can readily withstand the voltage conditions that are prevalent within a given semiconductor processing chamber. Preferably, the thickness of the top coat layer is in a range of 0.001 to 0.015 inch, and the thickness of the undercoat layer is in a range of 0.002 to 0.010 inch. It is understood that these ranges can vary depending on the particular processing conditions within the semiconductor processing chamber, and it is within the ability of one skilled in the art to modify the coating deposition process to achieve the desire thickness to account for the specific voltage, plasma erosion and corrosion conditions.

BRIEF DESCRIPTION OF THE DRAWINGS

The present invention is described in detail herein below in connection with the associated drawing figures, in which.

DETAILED DESCRIPTION OF THE INVENTION

Figure 1:
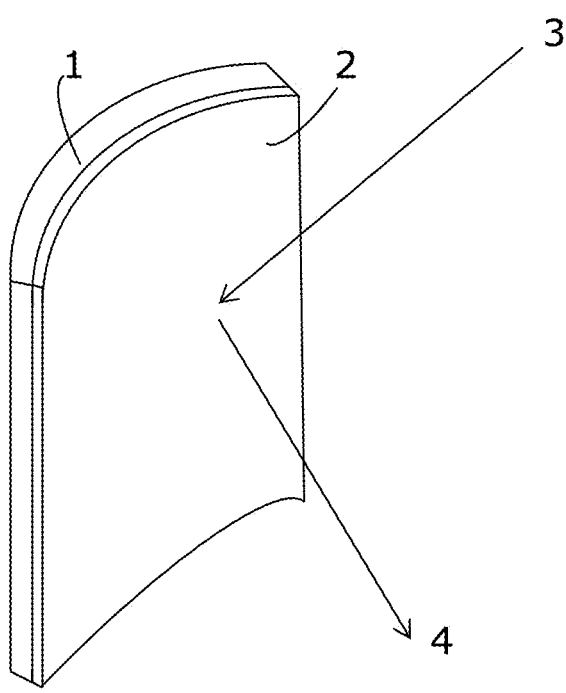
FIG. 1 is a perspective schematic view of a segment of a semiconductor chamber component having a high emissivity, plasma resistant coating deposited according to one aspect of the present invention.

FIG. 1 is a perspective schematic view of a segment of a semiconductor chamber component (i.e., substrate 1) having a thermal sprayed coating 2 having a high thermal emissivity and plasma resistance according to one aspect of the present invention formed thereon. Within the semiconductor processing chamber, the coated surface 2 of the substrate 1 is subject to the incident thermal energy 3, and the coated surface 2 reflects the incident thermal energy 3 as emissive thermal energy 4.

In order to determine the optimal thermal emissivity characteristics for the coatings according to the present invention, various coatings were deposited on substrates, and the thermal emissivity of the coated samples was measured using a standardized setup.

The samples were made from 6061T6 Aluminum substrates and the various coating compositions were applied to the substrates by plasma spray deposition techniques. For each of these samples, a DC plasma spray was used with a shrouding mechanism to reduce the amount of oxygen incorporated in the various coating compositions (i.e., the yttria, hafnia, yttria fully stabilized zirconia, or mixtures thereof) during the thermal spray process that deposited the coatings. Plasma spraying was conducted using various mixtures of ionized gases containing argon, nitrogen and hydrogen without any substantial presence of oxygen.

Specifically, argon, nitrogen and hydrogen were mixed in a ratio of 54:39:7% and DC plasma was ignited at 12 kW. The plasma spray device was mounted on a robot to provide rastering to deposit coatings on the sample surfaces at a speed of 1800 in/min. The specific ratio of the mixture is not critical so long as the effect of excluding oxygen is achieved, as one skilled in the art would understand, and such a skilled artisan could readily manipulate the processing parameters to achieve suitable spraying results.

The coated samples were then placed in a vacuum chamber on a heated platen. The samples were heated during emissivity measurement to various temperatures in a range of 60 to 150° C. An infrared imaging detector that was sensitive to infrared energy in a wavelength of 8 to 15 μm was positioned to view the heated samples. The temperature of each sample was measured by a thermocouple embedded in the test sample closer to the coated surface. A small sample that was calibrated as a black body with an emissivity of 1 was used as a reference and mounted next to each sample during the infrared detector measurements. The emissivity was measured on the coated samples and compared with the reference sample as an integrated value over the range of sensitivity.

Figure 2:
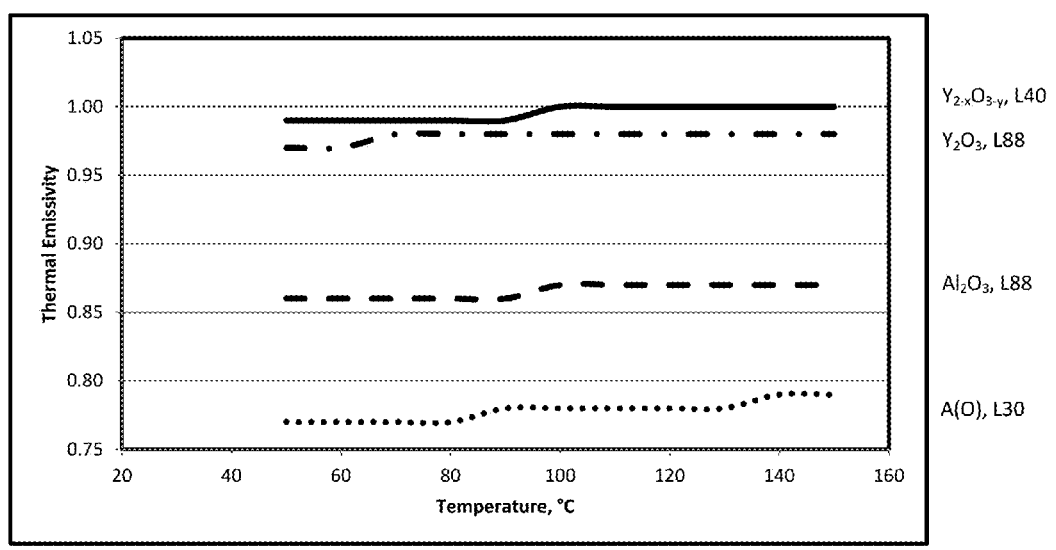
FIG. 2 is a graph showing the thermal emissivity values of various coating compositions as a function of temperature and including the color value L.
Figure 3:
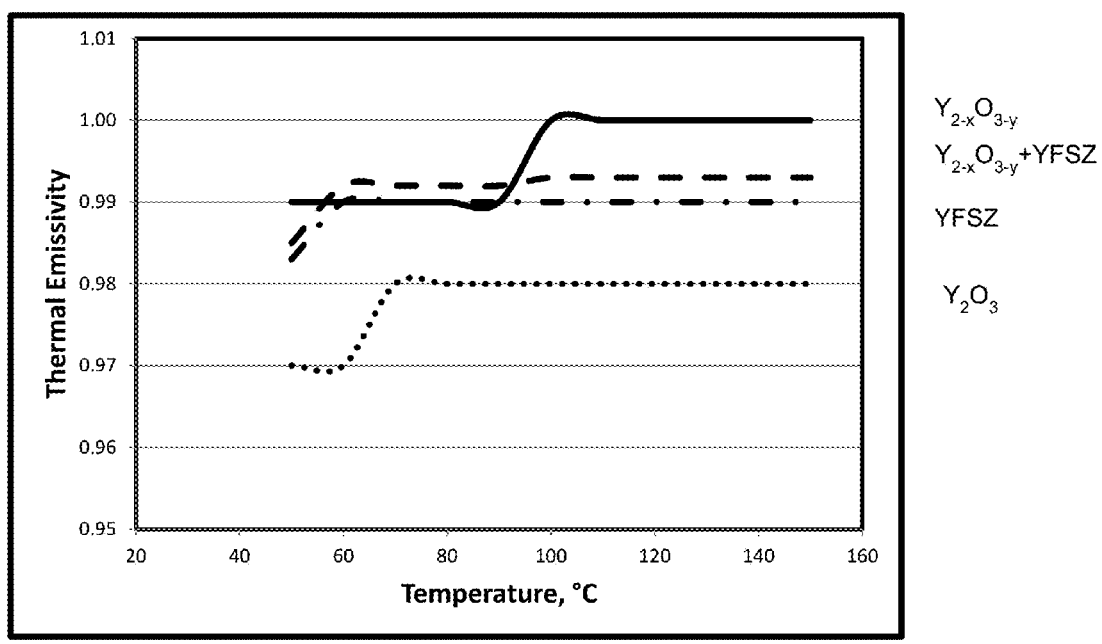
FIG. 3 is a graph showing the thermal emissivity of thermal sprayed coatings as a function of temperature.

The coatings were made from materials of various compositions, as shown in FIGS. 2 and 3, and the color of the coatings was changed by changing coating parameters with respect to the exclusion of oxygen, as described above.

FIG. 2 shows coating compositions, along with the associated color characteristics represented by "L" values, as measured by a spectrophotometer according to the accepted CIE L-a-b standards, and the variation in emissivity as a function of temperature.

FIG. 2 shows that an aluminum oxide material Al(O) had the lowest emissivity in a range of 0.77 to 0.79 with an L value of 30. On the other hand, another aluminum oxide coating material having the same elemental composition of Al and O, but formed with near $Al_2O_3$ proportions, had an emissivity in a range of 0.86 to 0.87 with an L value of 88.

FIG. 2 further shows the response of a coating having near $Y_2O_3$ proportions of Y and O and having a thermal emissivity in a range of 0.97 to 0.98 with an L value of 88, compared to another yttrium oxide coating with an elemental composition of $Y_{2-x}$ and $O_{3-y}$, where $0<x<2$ and $0<y<3$, to obtain an L value of 40 and a thermal emissivity in a range of 0.99 to 1, where an emissivity of 1 is the maximum value that can be obtained from a material.

Further work was concentrated to determine the specific compositions that would be preferable under semiconductor processing chamber conditions in order to resist fluorine and chlorine plasma erosion. Such materials were found to be based on elemental compositions of Y, Zr and Hf oxides. Thermal spray coatings were developed using these oxides in a color range L of 35 to 45, and closer to an L value of 40. The thermal emissivity values of these select thermal sprayed coatings were measured and are shown in FIG. 3.

FIG. 3 shows standard white color yttria $Y_2O_3$ coatings with an L value of 88 and having an emissivity in a range of 0.97 to 0.98. FIG. 3 also shows yttria fully stabilized zirconia coatings (YFSZ), which were thermal sprayed to have a black color with an L value of about 45 under reduced oxygen conditions. These coatings had a thermal emissivity in a range of 0.98 to 0.99. Typically, YSZ normally includes less than 14 wt % $Y_2O_3$, whereas in these YFSZ coatings, more than 17 wt % $Y_2O_3$ was utilized to provide a fully stable cubic phase.

FIG. 3 also shows co-deposited emissivity controlled yttria ($Y_{2-x}O_{3-y}$) and yttria fully stabilized zirconia (herein also referred to as YO+YFSZ) with an L value of 40. These coatings also exhibited a thermal emissivity of 0.98 to 0.99.

FIG. 3 further shows yttria coatings thermal sprayed with an L value of 40 and an emissivity that ranges from 0.99 to a maximum of 1 for a composition of $Y_{2-x}O_{3-y}$, where $0<x<2$ and $0<y<3$. These coatings with thermal emissivity values in a range of 0.98 to a maximum of 1 are advantageous for use in connection with semiconductor processing chamber components in order to increase the ability of and efficiency with which the coated surfaces reflect radiant energy into the work space.

EXAMPLES

Example 1

Test samples were made using a 6061T6 aluminum substrate. The substrates were roughened by grit-blasting to reach a surface roughness of about 200 µin Ra. The substrates were coated with 0.004 to 0.006 inch of emissivity controlled yttria coating ($Y_{1.5}O_{2.5}$). The DC plasma spray with shrouding mechanism was used according to the same process described above to deposit the coatings using a mixture of ionized gases containing argon, nitrogen and hydrogen in a ratio of 54:39:7%, respectively, as described above, without any substantial presence of oxygen.

The color of the samples appeared black with L=40, a=−0.2 and b=−1.1, as measured by a spectrophotometer in accordance with the standard procedures established by the CIE (Commission Internationale de l'Eclairage, a.k.a., the International Commission on Illumination) for the L-a-b color space scale.

The hardness of the coatings was measured by a Vickers indentor according to standard procedures outlined in ASTM E384. For Example 1, the hardness of the coatings were 520 HV0.3 kg/mm².

The porosity of the coating samples was measured according to the standard testing procedures outlined in ASTM E2109. For Example 1, the porosity was measured to be <0.5%.

The coating bond strength was tested following the standard procedure outlined in in ASTM C633. For Example 1, the coating bond strength was measured to be >5000 psi.

The thermal emissivity was measured, as described above, to be 0.98 to 1 over a temperature range of 50 to 160° C.

A step voltage was applied on the coated surface in accordance with the standard procedures outlined in ASTM D149. In Example 1, the coatings resisted breakdown up to 2800 V.

Figure 4A:
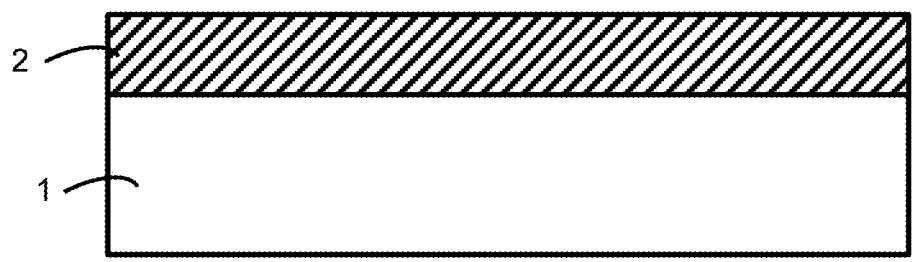
FIGS. 4A-4D are schematic cross-sectional diagrams illustrating the coating configurations of Examples 1-4 according to the present invention.

FIG. 4A is a schematic cross-sectional view representing a sample from Example 1, including a single layer, single phase coating 2 provided on the substrate 1. As shown, the hatch marks used in the drawings (or lack thereof) are intended to differentiate the coating layers, and are not intended to specify the materials or compositions of those coating layers.

Figure 5A:
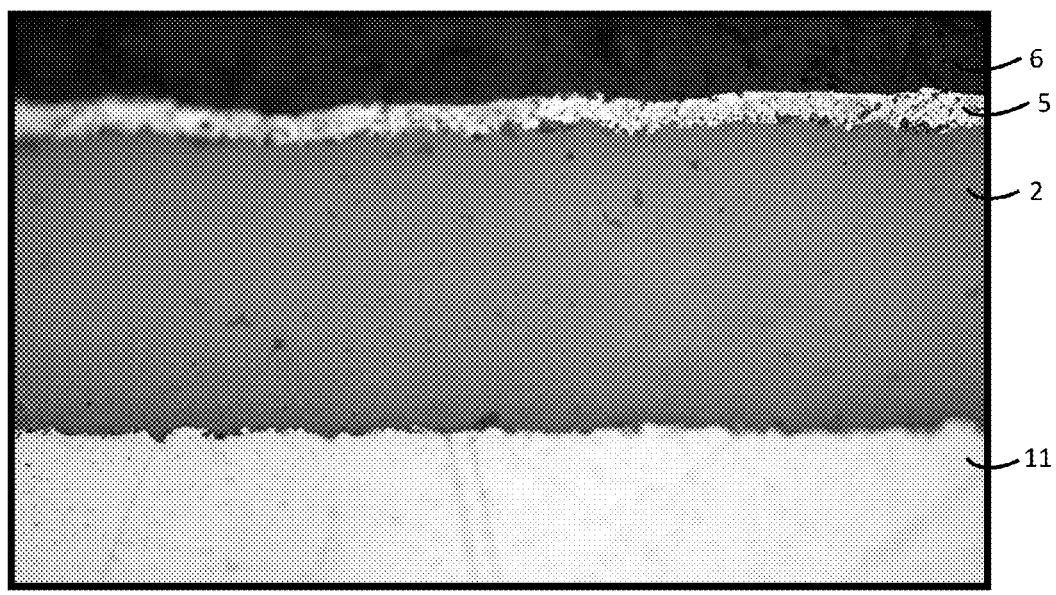
FIGS. 5A-5D are cross-sectional optical photomicrographs taken in the thickness direction of the coating configurations and microstructures of Examples 1-4 according to the present invention.

FIG. 5A is an actual optical photomicrograph taken from a coated sample according to Example 1. The optical micrographs show the coating microstructure in cross-section. The optical micrograph was obtained by mounting a sample in a resin and then polishing the mount to reveal the coating microstructure through the coating thickness following standardized polishing procedures according to ASTM E1920.

In FIG. 5A, from top to bottom, the various layers are designated as follows: a mounting material 6, an edge retention foil layer 5 provided to highlight the edges, the emissivity controlled yttria coating layer 2, and the aluminum substrate 1.

Example 2

Test samples were made using 6061AL aluminum substrates that were roughened to 200 µin Ra by grit blasting, and then emissivity controlled co-phase (50/50 wt %) coatings of yttria (YO), having a composition of $Y_{1.5}O_{2.5}$, and yttria fully stabilized zirconia (YFSZ) having a composition of $Y_{0.15}Zr_{0.85}O_{1.93}$, were applied by a DC plasma spray with shrouding mechanism according to the same process described above to deposit the coatings using a mixture of ionized gases containing argon, nitrogen and hydrogen in a ratio of 45:45:10%, respectively, without any substantial presence of oxygen.

The emissivity of the test samples were measured to be in a range of 0.98 to 0.99 over a temperature range of 50 to 160° C. The color of the samples, as measured with a spectrophotometer, appeared black with values of L=42, a=−0.5, b=−1.3. The coated samples were exposed to 5 wt % HCl for 24 hours. The area exposed to HCl did not show any signs of corrosion when examined under scanning electron microscope.

Figure 4B:
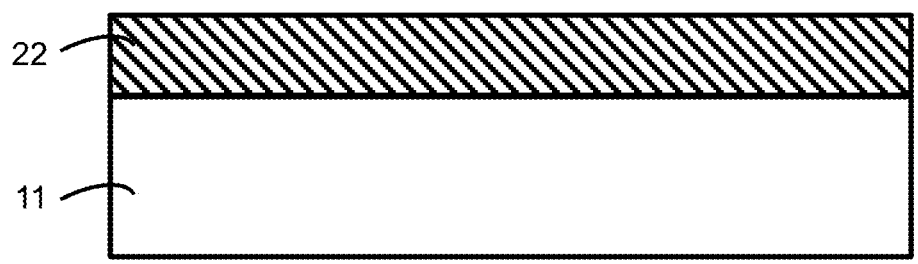

FIG. 4B is a schematic cross-sectional view representing a sample from Example 2, including a single layer, co-phase coating 22 provided on the aluminum substrate 11.

Figure 5B:
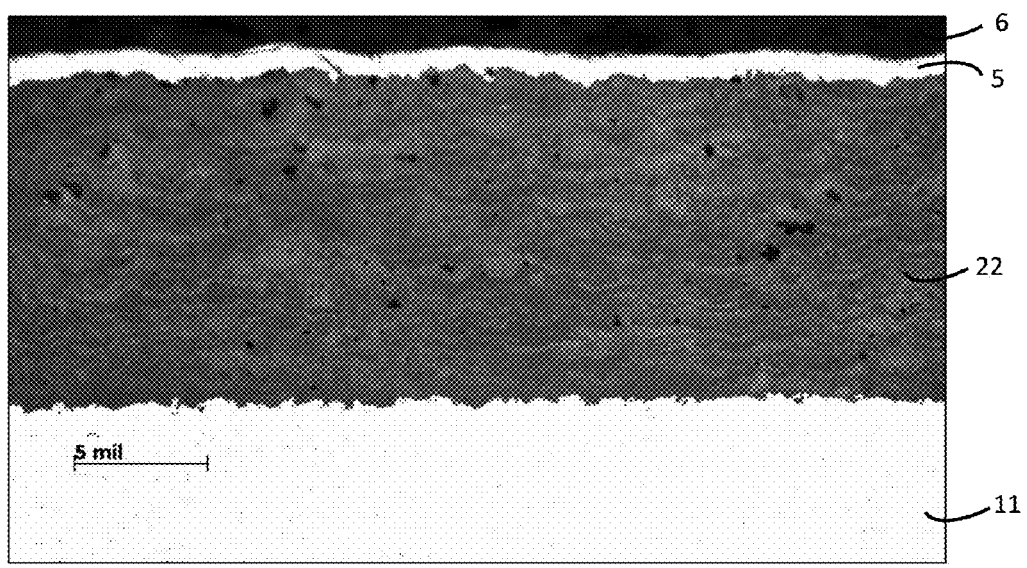

FIG. 5B is an actual optical photomicrograph taken from a sample according to Example 2, including the mounting material layer 6, the edge retention foil layer 5, the emissivity controlled co-phase coating layer 22, and the substrate 11.

Example 3

Test samples were made using 6061 aluminum substrates. A wet corrosion barrier coating of 50/50 YFSZ/YO, having the composition of $Y_{0.15}Zr_{0.85}O_{1.93}/Y_{1.5}O_{2.5}$, was applied to a thickness of 0.004 inch by a DC plasma spray device with a shrouding mechanism using a mixture of ionized gases containing argon and hydrogen in a ratio of 90:10% without any substantial presence of oxygen described above. Then an emissivity controlled yttria coating ($Y_{1.5}O_{2.5}$) was applied to a thickness of 0.004 inches by a DC plasma spray device with a shrouding mechanism using the same mixture of ionized gases containing argon and hydrogen without any substantial presence of oxygen. The samples were then wiped with 5% HCl, ultrasonic cleaned in DI water, baked at 85° C., 110° C. and 220° C. These cycles of acid cleaning and thermal cycling were repeated 10 times, and then the bond strength of the samples was measured. It was found that the initial bond strength was 6000 psi and the retained bond strength after the 10× clean/bake cycles was 100%, 90% and 80% respectively.

Figure 4C:
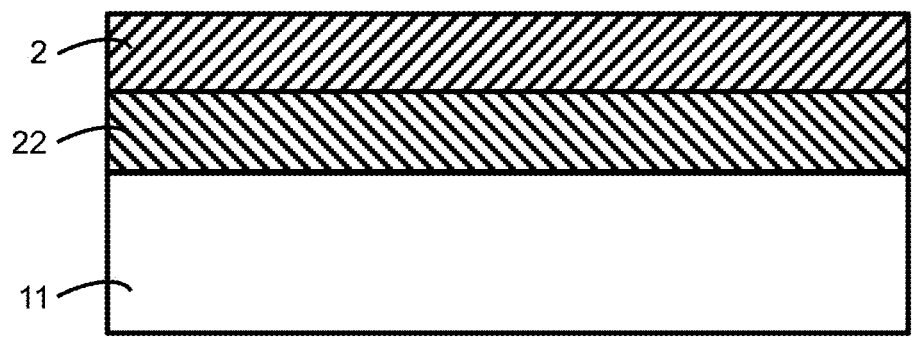

FIG. 4C is a schematic cross-sectional view representing a sample from Example 3, including a double-layer coating formed on the substrate 11. The double layer coating includes the $Y_{1.5}O_{2.5}$ top layer 2 formed over the co-phase $Y_{0.15}Zr_{0.85}O_{1.93}/Y_{1.5}O_{2.5}$ underlayer 22, which is formed on the substrate 11.

Figure 5C:
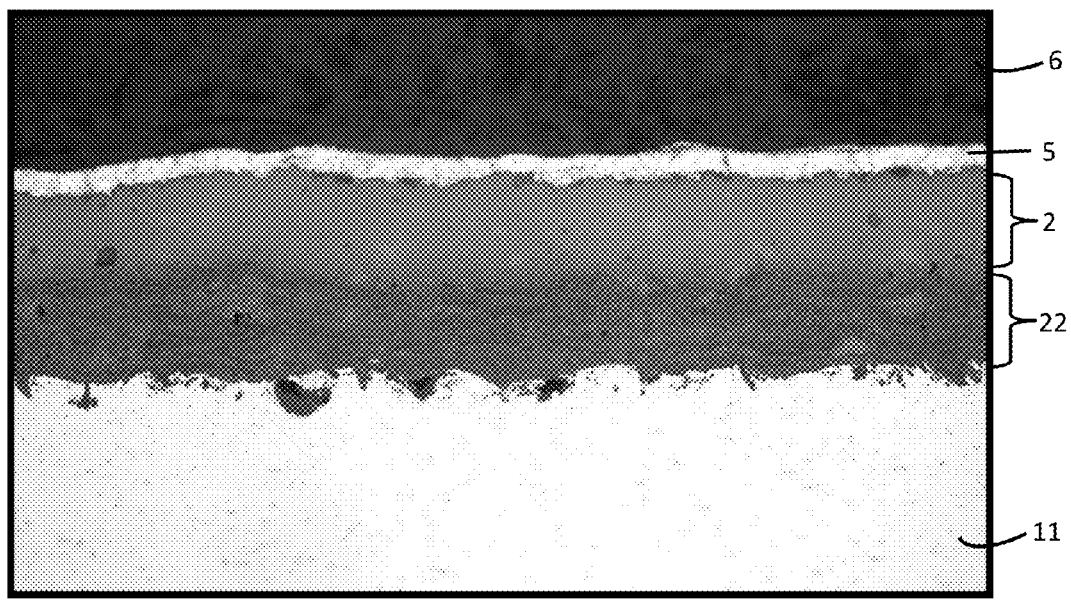

FIG. 5C is an actual optical photomicrograph taken from a sample according to Example 3. The layers shown include the mounting material 6, the edge retention foil 5, the upper layer 2 (top coat), the co-phase undercoat layer 22, and the substrate 11.

Example 4

Test samples were made using 6061 aluminum substrates that were grit-blasted to a surface roughness of about 250 μin Ra. The samples were then anodized to form an anodized alumina coating that was about 1.7 mils thick. The rough anodized surface was then coated with YFSZ/YO (50/50 wt %) co-phase coating, having the composition of $Y_{0.15}Zr_{0.85}O_{1.93}/Y_{1.5}O_{2.5}$, by a DC plasma spray device with a shrouding mechanism using the same mixture of ionized gases containing argon, nitrogen and hydrogen without any substantial presence of oxygen described above in Example 1, and without any further grit-blasting. The co-phase coating was about 0.004 inch thick. Then a top coating of an emissivity controlled yttria coating ($Y_{1.5}O_{2.5}$) was deposited by a DC plasma spray device with a shrouding mechanism using the same mixture of ionized gases containing argon, nitrogen and hydrogen without any substantial presence of oxygen. The top layer coating thickness was about 0.004 inches. A step voltage was applied on the multilayer coated samples, which were found to withstand about 5500 V without any breakdown when the voltage was maintained for 6 hours.

Figure 4D:
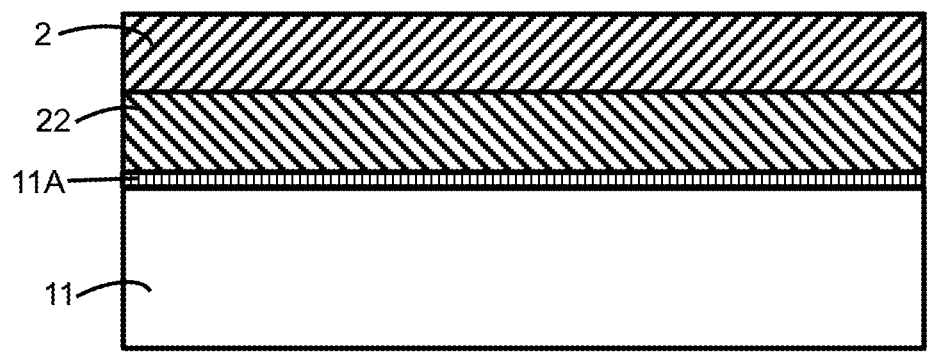

FIG. 4D is a schematic cross-sectional view representing a sample from Example 4 having a three layer coating, including the substrate 11, the anodized alumina layer 11A formed thereon, the co-phase underlayer 22 formed atop the layer 11A, and the emissivity controlled top coat 2 formed on the undercoat layer 22.

Figure 5D:
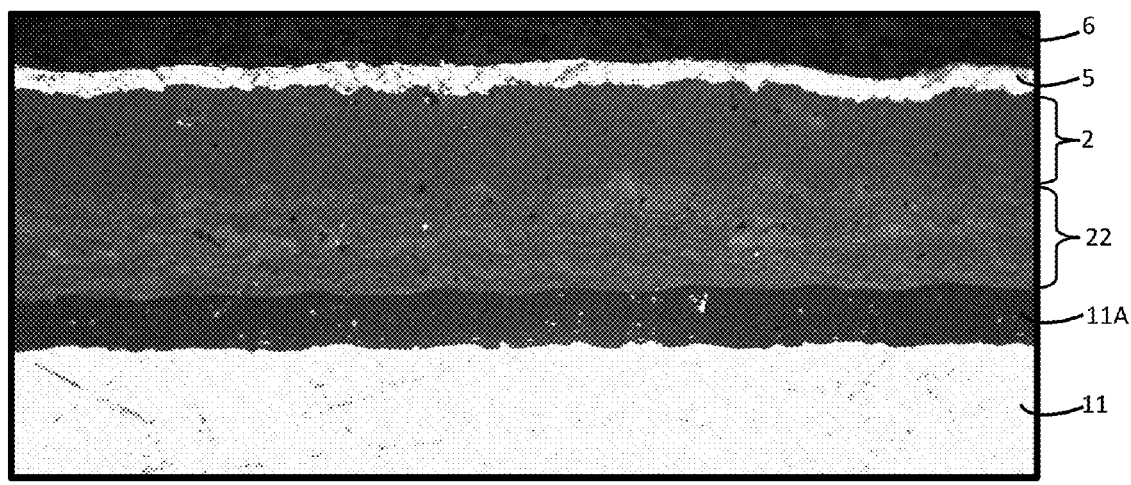

FIG. 5D is an actual optical photomicrograph taken from a sample according to Example 4. In FIG. 5D, the layers are represented as follows: the mounting material 6, the edge retention layer 5, the top coat layer 2, the co-phase undercoat layer 22, the anodized alumina layer 11A, and the substrate 11.

Example 5

Test samples made using 6061 aluminum were separately coated with an emissivity controlled yttria coating ($Y_{1.5}O_{2.5}$) and co-phase ($Y_{1.5}O_{2.5}$)/$Y_{0.15}Zr_{0.85}O_{1.93}$ coating by a DC plasma spray device with a shrouding mechanism under the same conditions as Example 1. The as-coated samples had a surface roughness of 210 μin Ra and 250 μin Ra, respectively. To obtain textured surface samples, the surfaces of some of the samples were first polished with a 30 micron diamond coated film, and then with a 9 micron diamond coated film using a circular motion to obtain a textured coating having a surface roughness in a range of 60 to 120 μin Ra. The surface texturing did not change the color of the coatings, and the spectrometer read L=40.4, a=0.1 and b=−1.1 for the yttria coatings, and L=41.2, a=−0.2 and b=1.2 for the $Y_{1.5}O_{2.5}/Y_{0.15}Zr_{0.85}O_{1.93}$ co-phase coatings. The as-coated and textured samples were immersed separately in an ultrasonic bath, and the particles generated during sonification were counted with a liquid particle counter. It was found that the surface textured samples generated about 75% fewer particles compared to the as-coated surface samples during the same ultrasonic exposure time.

Example 6

Three circular shells having a 12 inch inner diameter (ID), 6 inch height and a wall thickness of 0.25 inch were made of 6061 T6 aluminum. The parts were first coated with thermal sprayed Si having a thickness of 0.002 to 0.003 inches, and then one shell was coated with emissivity controlled yttrium oxide ($Y_{1.5}O_{2.5}$), one shell was coated with fully stabilized yttrium zirconium oxide YFSZ having a composition of $Y_{0.15}Zr_{0.85}O_{1.93}$, and one shell was coated with a co-phase emissivity controlled coating of YO/YFSZ having a composition of $Y_{1.5}O_{2.5}/Y_{0.2}Zr_{0.8}O_{2.4}$. The coatings were each applied a DC plasma spray device with a shrouding mechanism to reduce oxygen infiltrating into the plasma effluent, in the manner described above. These parts were then heated to 100° C. and then cooled to room temperature. This cycle was repeated 10 times. When the parts were examined, no evidence of cracking or coating spallation was seen.

The yttria coated shell was cleaned with an Hf wipe, and the YFSZ and YO/YFSZ coated shells were cleaned with an HCL wipe. All of the shells were then cleaned in a DI water ultrasonic bath, and later dried at 85° C. for 1 hr. The parts were visually examined, and none showed any signs of cracking or coating spallation.

Example 7

A circular shell of 12 inch ID and 6 inch height with a wall thickness of 0.25 inch was made of 6061 T6 aluminum. The part was first coated with a YO/YFSZ (50/50 wt %) co-phase coating made of $Y_{1.5}O_{2.5}+Y_{0.2}Zr_{0.8}O_{2.4}$ that was about 0.003 to 0.004 inch thickness. Then a top layer of emissivity controlled $Y_{1.5}O_{2.5}$ coating was deposited without any surface roughing of the first coating layer. The emissivity controlled coating was about 0.004 to 0.006 inch thick. The coatings were each applied by a DC plasma spray device with a shrouding mechanism, as described above. The surface was finished to 100 μin Ra using diamond coated abrasive pads and surface color measurements were L=45, a=−1.3 and b=−0.74. The shell was cleaned in an ultrasonic chamber and then baked at 95° C. The coated part was then grit-blasted to remove all of the coating. The same coating layers were then deposited again, and the part dimensions were restored. The re-coated part was then ultrasonic cleaned and then thermally cycled 3× to 250° C. No cracking or spallation of the coating was observed. Color measurements were performed after the thermal cycling, and the results remained substantially unchanged.

This test showed that parts coated with the emissivity controlled coating according to the present invention can be recycled, with the preservation of the components even after a part has been used in a process chamber.

Table 1 below shows compositions and properties of emissivity controlled coatings according to the present invention, which were also evaluated using a Scanning Electron Microscope (SEM) equipped with an Energy Dispersive X-Ray Spectrometer (EDS) according to the standards to ASTM E1508.

TABLE 1

| Coatings<br>EDS Composition, wt % | $Y_{2-x}O_{3-y}$ | $Y_{2-x}O_{3-y}$ +<br>YFSZ | YFSZ | YFSZ +<br>HfO |
|---|---|---|---|---|
| Y | 85 | 47 | 47 | 18 |
| Zr | 0 | 34 | 34 | 65 |
| Hf | 0 | 0 | 0 | 4 |
| O | Balance | Balance | Balance | Balance |
| Hardness, kg/mm² | 550 | 450 | 540 | 545 |
| Porosity, % | <1 | <1 | <2 | <1 |
| Voltage Breakdown Strength, V/mil | 550 | 450 | 450 | 450 |
| Color, L | 40 | 42 | 45 | 45 |
| Color, a | −0.2 | −0.2 | 0.1 | −0.1 |
| Color, b | −1.1 | −1.1 | 1.2 | 1.16 |
| Emissivity, max | 0.98 | 0.98 | 0.98 | 0.98 |
| Emissivity, min | 1 | 0.99 | 0.99 | 0.99 |

Example 8

Test samples made using 6061 Aluminum substrates were coated with emissivity controlled yttria ($Y_{1.5}O_{2.5}$) coatings with an L value of 40. These samples were exposed to plasma erosion in a reactive ion etching chamber, where plasma was generated with a gas mixture containing reactive ions of fluorine in the presence of oxygen. The samples were biased at 2000 Watts at 13.56 MHz. The same plasma erosion conditions were also applied to commercially available yttria coatings having a composition of $Y_2O_3$ applied on 6061 Aluminum substrates using the same plasma spray manner that appeared white with an L value of 88. It was found that the plasma erosion rate, measured by a loss of thickness, of the emissivity controlled coatings was about 42% less than that of the commercially available, white color (L=88) yttria coatings.

Example 9—Comparative Examples

An emissivity controlled yttria ($Y_{1.5}O_{2.5}$) coating was deposited in the same plasma spray manner described above on a 6061 aluminum substrate. The coated surface of the sample was then exposed to 5 wt % HCl for 24 hrs. The sample was then rinsed with deionized (DI) water and baked at 85° C. for 1 hour to dry the sample. The sample showed blistering of the coating. The sample was cross-sectioned, and it was found that the HCl had corroded the coating/substrate interface.

Another sample including a 6061 Al substrate was first coated with a high purity Si coating, and then an emissivity controlled yttria ($Y_{1.5}O_{2.5}$) coating was deposited on top of the Si undercoat layer without any surface roughening. This sample was also exposed to 5 wt % HCl for 24 hours, but did not show any blistering of the coating. The sample was also sectioned, and no evidence of corrosion was found at either the Si-coating/yttria-coating interface, or at the Si-coating/substrate interface that could lead to coating spallation.

The above examples demonstrate that the present invention provides an emissivity controlled top coat that has high thermal emissivity and resistance to plasma erosion through its thickness and low particle generation when textured, that the undercoat has undercut-resistance (i.e., resistance to wet corrosion), and that controlling the overall thickness of the coatings provides dielectric breakdown resistance. Accordingly, the emissivity controlled coatings according to the present invention provides the desired multi-tiered protection for semiconductor processing chamber components in a manner that has not been heretofore considered or achieved by the prior art.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A coating comprising:
   at least a first coating layer having a thermal emissivity of more than 0.98 to 1, and having a color value L in a range of 35 to 40 through a thickness direction thereof, wherein said coating has a surface roughness of 60 to 120 μin Ra.

2. The coating according to claim 1, further comprising at least a second coating layer, wherein said first coating layer defines a top coat layer and said second coating layer defines an undercoat layer.

3. The coating according to claim 2, wherein said second coating layer comprises at least two of yttrium oxide, hafnium oxide, and yttria fully stabilized zirconium oxide.

4. The coating according to claim 2, wherein said second coating layer comprises silicon, silicon and silicon carbide, aluminum and silicon carbide, nickel, molybdenum or tungsten.

5. The coating according to claim 1, wherein said first coating layer comprises at least one of yttrium oxide, hafnium oxide, yttria fully stabilized zirconium oxide and mixtures thereof.

6. The coating according to claim 5, wherein in said first coating layer, compounds of the yttrium and oxygen, zirconium and oxygen or hafnium and oxygen are concentrated in distinct segments of layers that are uniformly distributed in a direction that extends parallel to a surface of a substrate on which said first coating layer is provided.

7. The coating according to claim 1, wherein a concentration of a composition of said first coating layer is graded in said thickness direction thereof from approximately 1 wt % at an interface between said first coating layer and a surface of a substrate on which said first coating layer is formed to 100 wt % at an upper surface of said first coating layer that is exposed to a plasma environment.

8. The coating according to claim 1, wherein a composition of said first coating layer is $Y_{(2-x)}O_{(3-y)}$, wherein $0<x<2$ and $0<y<3$.

9. A component for a semiconductor processing chamber, the component comprising:
   a substrate; and
   a coating provided on a surface of said substrate, said coating comprising at least a first coating layer having a thermal emissivity of more than 0.98 to 1, and having a color value L in a range of 35 to 40 through a thickness direction thereof wherein said coating has a surface roughness of 60 to 120 µin Ra.

10. The component for a semiconductor processing chamber according to claim 9, wherein said coating further comprises at least a second coating layer, and wherein said first coating layer defines a top coat layer and said second coating layer defines an undercoat layer proximate said surface of said substrate on which said coating is formed.

11. The component for a semiconductor processing chamber according to claim 10, wherein said second coating layer comprises at least two of yttrium oxide, hafnium oxide, and yttria fully stabilized zirconium oxide.

12. The component for a semiconductor processing chamber according to claim 11 wherein in said first coating layer, compounds of the yttrium and oxygen, zirconium and oxygen or hafnium and oxygen are concentrated in distinct segments of layers that are uniformly distributed in a direction that extends parallel to said surface of said substrate on which said coating is formed.

13. The component for a semiconductor processing chamber according to claim 10, wherein said second coating layer comprises silicon, silicon and silicon carbide, aluminum and silicon carbide, nickel, molybdenum or tungsten.

14. The component for a semiconductor processing chamber according to claim 9, wherein said substrate comprises a metal or a sintered ceramic material.

15. The component for a semiconductor processing chamber according to claim 14, wherein said substrate comprises aluminum, aluminum alloys or anodized aluminum.

16. The component for a semiconductor processing chamber according to claim 14, wherein said substrate comprises a material selected from the group consisting of $Al_2O_3$, AlN, SiC and graphite.

17. The component for a semiconductor processing chamber according to claim 9, wherein said first coating layer comprises at least one of yttrium oxide, hafnium oxide, yttria fully stabilized zirconium oxide and mixtures thereof.

18. The component for a semiconductor processing chamber according to claim 9, wherein a concentration of a composition of said first coating layer is graded in said thickness direction thereof from approximately 1 wt % at an interface between said first coating layer and said surface of said substrate on which said coating layer is formed to 100 wt % at an upper surface of said first coating layer that is exposed to a plasma environment.

19. The component for a semiconductor processing chamber according to claim 9, wherein said component comprises any one of a chamber liner, a focus ring, a susceptor, a shower head, a nozzle, a heating element and an electrostatic chuck.

20. The component according to claim 9, wherein a composition of said first coating layer is $Y_{(2-x)}O_{(3-y)}$, wherein $0<x<2$ and $0<y<3$.

21. A method for providing an emissivity controlled coating for a semiconductor processing chamber component, said method comprising the steps of:
   providing a component for use in a semiconductor processing chamber;
   applying a coating to a surface of said component using one of a plasma thermal spray device, HVOF, a D-Gun, SPS, AD and combinations thereof;
   wherein said coating comprises at least a first coating layer, said at least first coating layer having a thermal emissivity of more than 0.98 to 1, and having a color value L in a range of 35 to 40 through a thickness direction thereof, wherein said coating has a surface roughness of 60 to 120 µin Ra.

22. The method according to claim 21, wherein said coating further comprises at least a second coating layer, and wherein said step of applying a coating further comprises applying said second coating layer to said surface of said component, prior to forming said at least first coating layer to said surface of said component, whereby said at least first coating layer defines a top coat layer and said second coating layer defines an undercoat layer.

23. The method according to claim 21, further comprising the steps of:
   texturing said coating to have a reduced surface roughness;
   precision cleaning said component in an ultrasonic chamber;
   using said component in a semiconductor processing chamber for a first useful life cycle thereof;
   then grit blasting said component to remove said coating; and
   then reapplying said coating to said component to restore functionality to said component for repeated use in a semiconductor processing chamber.

* * * * *